United States Patent [19]
Cosley

[11] 4,159,088
[45] Jun. 26, 1979

[54] SYSTEM FOR REDUCING AIRCRAFT FUEL CONSUMPTION

[75] Inventor: Dennis H. Cosley, Bellevue, Wash.

[73] Assignee: The Boeing Company, Seattle, Wash.

[21] Appl. No.: 848,684

[22] Filed: Nov. 4, 1977

Related U.S. Application Data

[63] Continuation-in-part of Ser. No. 756,160, Jan. 3, 1977, abandoned.

[51] Int. Cl.² .............................................. G05D 1/08
[52] U.S. Cl. .................................... 244/182; 244/180; 364/433; 364/442
[58] Field of Search ......................... 73/178 R, 178 T; 244/180–183, 186–188; 318/583, 584; 364/427, 428, 431, 433, 442

[56] References Cited

U.S. PATENT DOCUMENTS

| 2,701,111 | 2/1955 | Schuck | 244/182 |
| 2,992,558 | 7/1961 | Newell et al. | 73/178 R |
| 3,088,669 | 5/1963 | Sauer et al. | 364/442 |
| 3,221,759 | 12/1965 | Banning, Jr. | 244/182 X |
| 3,295,796 | 1/1967 | Gaylor | 244/187 |
| 3,589,648 | 6/1971 | Gorham et al. | 244/180 X |
| 3,612,837 | 10/1971 | Brandau | 364/442 |
| 3,691,356 | 9/1972 | Miller | 244/181 X |
| 3,764,785 | 10/1973 | Harner et al. | 364/442 |
| 3,813,063 | 5/1974 | Martin | 244/182 |
| 3,836,690 | 9/1974 | Purtle, Jr. | 73/178 R X |
| 4,032,093 | 6/1977 | Bonne et al. | 244/180 |

FOREIGN PATENT DOCUMENTS 851576  9/1970  Canada ................................. 364/442

OTHER PUBLICATIONS

Stengel, R. F. et al., "Energy Management for Fuel Conservation in Transport Aircraft", IEEE Transactions on Aerospace and Electronics, vol. AES-12, No. 4, Jul. 1976, pp. 464–470.

Primary Examiner—Stephen G. Kunin
Attorney, Agent, or Firm—Lynn H. Hess; B. A. Donahue

[57] ABSTRACT

A control system including both a method and apparatus for use on an aircraft during flight utilizes real-time data provided by sensing equipment on the aircraft to iteratively generate values for an efficiency parameter. The aircraft controls are adjusted after each iteration, and successive values of the efficiency parameter are compared until such comparison shows that the parameter has been substantially optimized. Iterations may then continue without corresponding control adjustments until comparison indicates that a current parameter value differs by a predetermined magnitude from the previously determined optimum value, at which time control adjustments resume in order to bring the efficiency parameter to a new substantially optimum parameter value.

45 Claims, 8 Drawing Figures

*Fig. 5*    MODE I METHOD

Fig. 6 — MODE II METHOD

SYSTEM FOR REDUCING AIRCRAFT FUEL CONSUMPTION

CROSS-REFERENCE TO RELATED APPLICATIONS

This application is a continuation-in-part of application Ser. No. 756,160 filed Jan. 3, 1977 and now abandoned.

BACKGROUND OF THE INVENTION

This invention relates to a method and apparatus for use on an aircraft to substantially minimize the total fuel consumed by the aircraft during a flight.

A significant part of the total cost of operating an aircraft is attributable to the cost of fuel expended during any given flight, and this cost is reduced to the extent that total fuel consumption for a flight is minimized. In the past, pilots have attempted to minimize the quantity of fuel needed for a given flight by pre-planning the flight with the aid of such information as expected weather conditions, performance information relative to the particular aircraft, and handbook data relating to courses, speeds, etc.

A number of in-flight pilot aids and control systems have also been used or suggested in the prior art for minimizing aircraft fuel consumption. Some of these utilize stored data of the type available from handbooks while others utilize real-time data sensed and processed from time to time during the flight by equipment on the aircraft. Some of these control systems provide automatic adjustment of aircraft controls while others simply provide a reference for the pilot, and some of the systems offer more than one operating mode for selection by the pilot as appropriate.

For example, in U.S. Pat. No. 3,221,759 issued to T. A. Banning, Jr., instruments are disclosed for controlling operations, as for example in a propeller-driven aircraft, to provide maximum economy of operation. This patent describes an iterative approach to the maximizing of operating economy through measured parameter sampling and comparison.

In the Canadian Pat. No. 851,576 issued to Arnold Guetta, a method and apparatus are disclosed for securing increased operational efficiency in a powered vehicle. According to the disclosure of this patent an operating mode is first selected, and this selection together with certain sensed inputs is provided to an analog computer which controls fuel flow. In some of the modes certain of the sensed inputs are selected and combined for comparison with preselected stored criteria of high efficiency, and in other modes the sensed inputs are provided to the computer and the throttle is automatically adjusted in response to a comparison of successive computed values based on the corresponding sensed inputs.

SUMMARY OF THE INVENTION

In accordance with the present invention a control system iteratively receives and processes input signals representative of current sensed values of certain operating parameters during a flight and generates output command signals in response to said iterations. The output command signals in turn effect incremental changes in the settings of certain aircraft controls.

In one form of the invention the control system includes a first operating mode selectable for operation during a climb portion of a flight and a second operating mode selectable for operation during a constant-altitude cruise portion of the flight. In the first operating mode fuel flow rate is held constant at a value which provides maximum rated thrust, and the operating parameter being monitored is rate of climb. In this mode the output control signals effect incremental changes in the pitch attitude of the aircraft so as to continuously maximize rate of climb and thereby cause the total fuel consumed during the climb portion of the flight to make an optimum contribution to minimizing total fuel consumed for the combined climb and cruise portions of the flight. In the second operating mode the monitored operating parameters are fuel flow rate, ground speed, distance remaining to destination, and total fuel already consumed; and the pitch attitude of the aircraft is controlled so that the rate of climb is zero and the aircraft altitude is maintained at a constant value. In this mode the output command signals effect incremental changes in the fuel flow rate to the aircraft engines so as to substantially minimize the total quantity of fuel consumed during the cruise portion of the flight.

In one preferred form of the invention, the control system comprises apparatus for substantially minimizing the total quantity of fuel consumed during a constant-altitude cruise portion of an aircraft flight, which apparatus includes logic means for (1) repeatedly receiving input signals representing current values of fuel flow rate, ground speed, distance to destination, and total fuel consumed, (2) iteratively generating current values of an efficiency parameter which is a function of said signals, (3) storing values of said efficiency parameter, (4) determining the differences between successive parameter values, (5) comparing said differences to a reference value, and (6) generating an output command signal in response to said comparison for effecting incremental changes in the fuel flow rate so as to substantially optimize within predetermined limits, the value of said efficiency parameter over the entire period of said constant-altitude cruise portion.

In another preferred form of the invention the control system comprises apparatus for optimizing the contribution of the fuel consumed during a climb portion of an aircraft flight to the overall fuel economy of the flight, the apparatus including logic means for (1) repeatedly receiving input signals representing current values of rate-of-climb, (2) storing said values, (3) determining the difference between successive values, (4) comparing said differences to a reference value, and (5) generating output command signals in response to said comparisons for effecting incremental changes in the pitch attitude of the aircraft so as to continuously maximize the rate of climb value.

The control system of the present invention includes both a method and apparatus as disclosed herein.

DESCRIPTION OF THE PREFERRED EMBODIMENTS

Figures 1, 4:
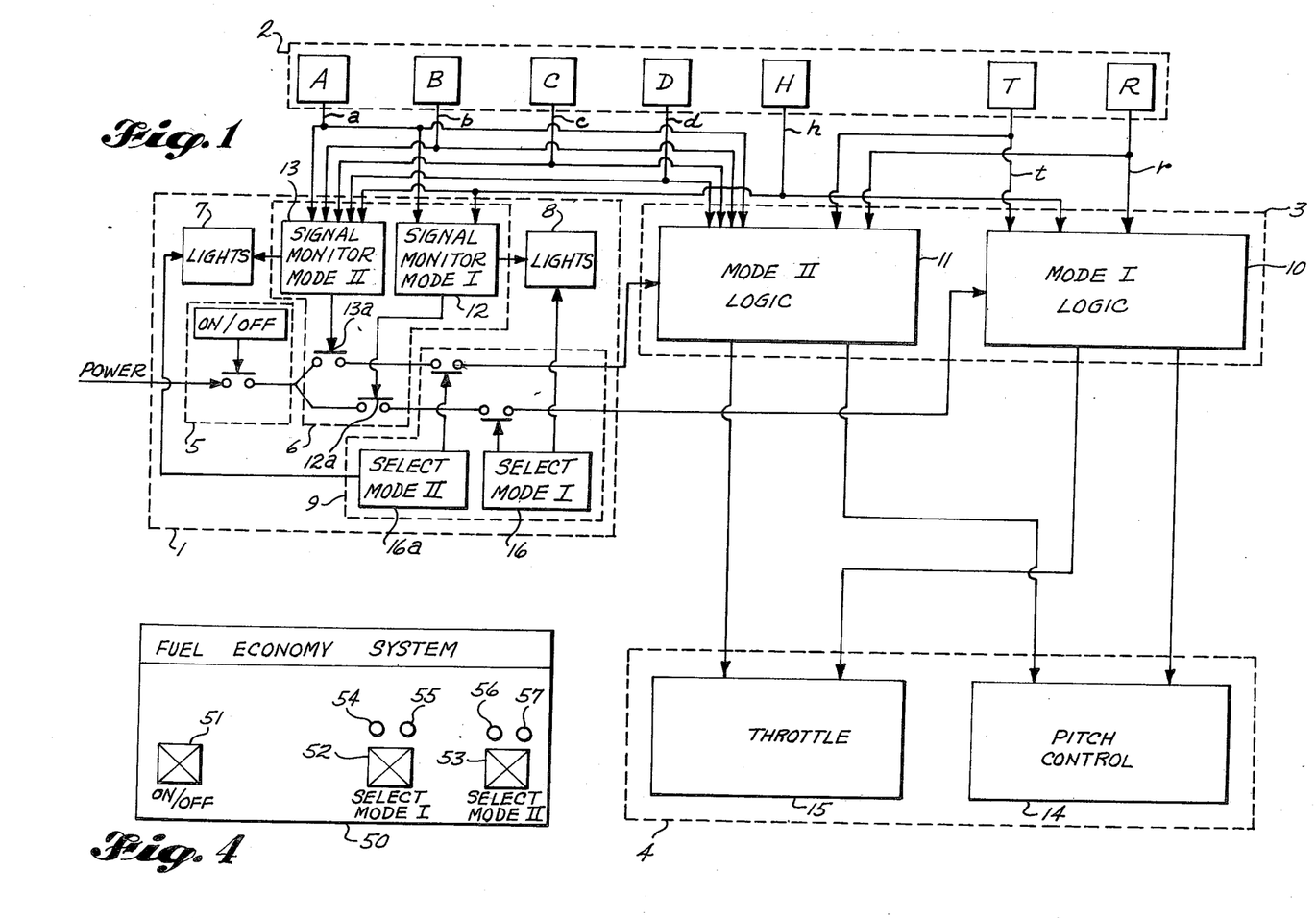
FIG. 1 shows, in schematic form, the control system of the invention.
FIG. 4 shows a control panel suitable for use with the control system of the invention.

The control system of the invention is shown in FIG. 1 as including a selecting apparatus 1, an input apparatus 2, a computing apparatus 3, and aircraft controls 4. The selecting apparatus comprises a switch 5 for turning the system on and off, signal monitoring apparatus 6, lights 7 and 8 associated with the monitoring apparatus, and mode selecting apparatus 9. The switch 5 may be of a conventional type operable by a push-button or lever as desired, and the selecting apparatus includes switches of a similar type as shown. The monitoring apparatus includes switches which are operated automatically in response to signals received by the monitoring apparatus.

The input apparatus includes equipment for sensing certain operating parameters continuously during a flight and repetitively generating signals representative of the sensed values of these parameters. As shown in FIG. 1, the input apparatus includes apparatus for sensing and generating signals representative of the operating parameters fuel flow rate (A), ground speed (B), distance remaining to destination or, more precisely, to the point in the flight where decent begins (C), total fuel consumed since mode II selection (D), and rate of climb (H), respectively; and the input apparatus may also include apparatus identified as T and R respectively for generating timing signals and signals representative of reference values. The signal values generated by these apparatus and representative of the operating parameters A, B, C, D, and H are identified in FIG. 1 as a, b, c, d, and h respectively.

The equipment comprising input apparatus 2 for performing the functions specified hereinabove is commercially available from a number of sources, and this equipment is normally present on large turbo-jet aircraft for utilization in connection with an autopilot system. For example, the apparatus for sensing and generating signals representative of ground speed may be an inertial navigation system (INS) such as a Delco Carousel IV or a Litton LTN 51, and the apparatus for sensing and generating signals representative of distance remaining to destination may be an area navigation system (RNAV) such as a Sperry TERN 100 or a Collins ANS70A.

The apparatus for sensing and generating signals representative of rate of climb may be an air data system commercially available from a number of different manufacturers including the Bendix Corporation and the Kollsman Instrument Division of Sun Chemical Corporation. The apparatus for sensing and generating signals representative of fuel flow rate may be a fuel flow transmitter commercially available, for example, from both the Eldec Corporation and Simmonds Precision Products, Inc.; and the apparatus for sensing and generating signals representative of total fuel consumed since mode selection may be a fuel totalizer available from a number of commercial sources including the same two companies.

The computing apparatus 3 includes a mode I logic portion 10 and a mode II logic portion 11, and each of the logic portions generates output command signals which may be received by the aircraft controls. The settings of the controls are incrementally adjusted in response to these output command signals.

The signals a and h are received by a mode I signal monitor portion 12 of monitoring apparatus 6, and in the presence of both signals a and h the monitor portion 12 causes an associated switch 12a to close. Similarly, the signals a, b, c, d, and h are received by a mode II signal monitor portion 13 of monitoring apparatus 6, and in the presence of all five of these signals the monitor portion 13 causes an associated switch 13a to close.

When the mode I logic portion 10 is operative, it repetitively receives signals h from input apparatus 2, and also receives timing pulses t and a reference value r. Pulses t and reference value r may be generated by input apparatus 2, as shown in FIG. 1, or one or both may be generated by the mode I logic portion itself. The mode I logic portion then generates output command signals in response to iterations comparing the difference between successive values of h to reference value r, and a pitch control 14 of aircraft controls 4 is responsive to these output command signals for causing incremental changes in the pitch attitude of the aircraft. While mode I logic is operative, the thrust of the aircraft is held constant at a maximum rated value, and the pitch attitude of the aircraft is controlled so as to result substantially in a continuously maximized value for rate of climb during the climb portion of the aircraft's flight.

When the mode II logic portion 11 is operative it repetitively receives signals a, b, c, and d from input apparatus 2, and also receives timing pulses t and a reference value r. Pulses t and reference value r may be generated by input means 2, as shown in FIG. 1; or one or both may be generated by the mode II logic portion itself. The mode II logic portion then generates output command signals in response to iterations which compare the difference between computed values of an efficiency parameter with the reference value r. A throttle 15 is responsive to these output command signals for causing incremental changes in the fuel flow rate, and hence the thrust of the aircraft; and while mode II logic is operative the pitch attitude is controlled so as to maintain the aircraft in a constant altitude cruise. The incremental changes in aircraft thrust (and hence aircraft speed) which are effected as a result of iterative calculations and processing of the efficiency parameter and corresponding output command signals maintain the aircraft at a speed which will result in substantially minimum fuel consumption over the constant altitude cruise portion of the aircraft's flight. Operation of the mode I and mode II logic portions will hereinafter be described in detail.

Figure 7:
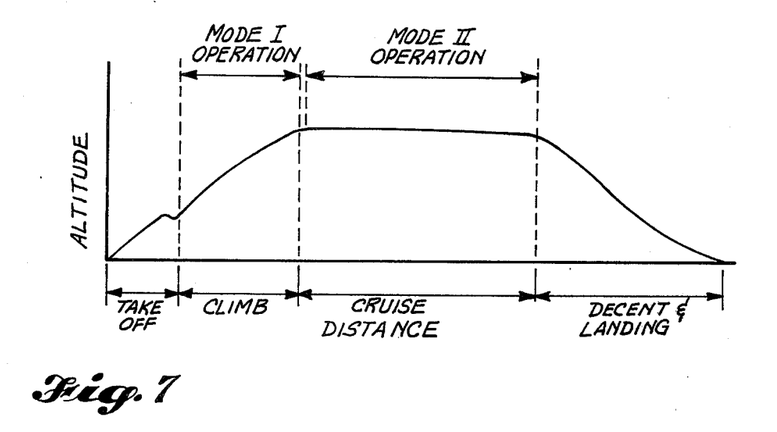
FIG. 7 shows, in graphical form, the relationship between aircraft altitude and distance flown.

FIG. 7 is a graphical representation of aircraft altitude as a function of flight distance for a typical complete flight and is useful for understanding the relationship between mode I and mode II operations of the control system. As seen from FIG. 7, mode I operation will coincide generally with the climb portion of the flight, and mode II operation will begin as soon as the aircraft's altitude has stabilized after climb and continue to the end of the cruise portion of the flight. Of course, a flight could include more than one mode I and/or mode II period as, for example, where the flight includes two or more cruise portions at different altitudes or where a constant-altitude cruise is temporarily interrupted for some reason.

Figure 2:
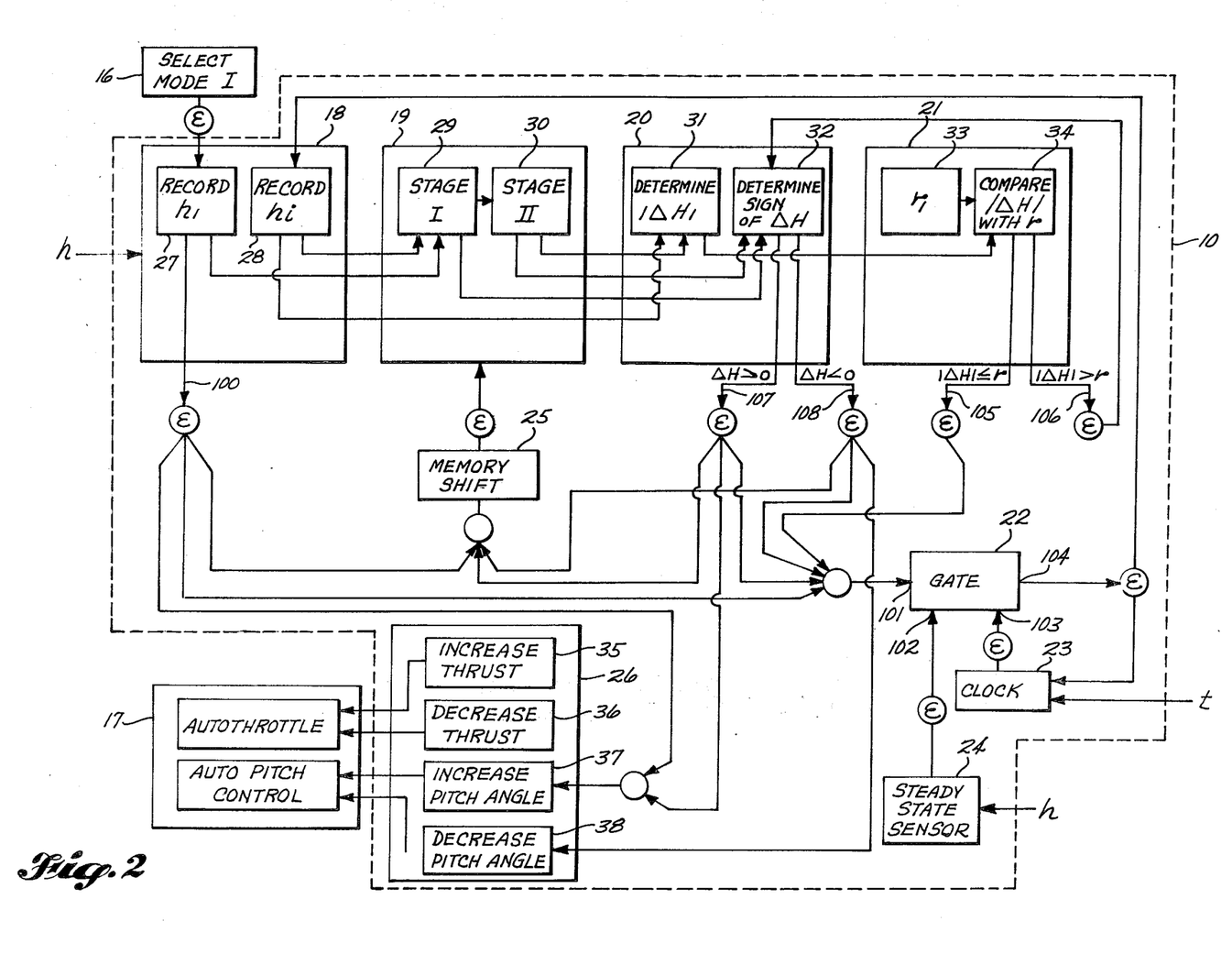
FIG. 2 shows, in schematic form, one logic portion of the control system of the invention.
Figure 3:
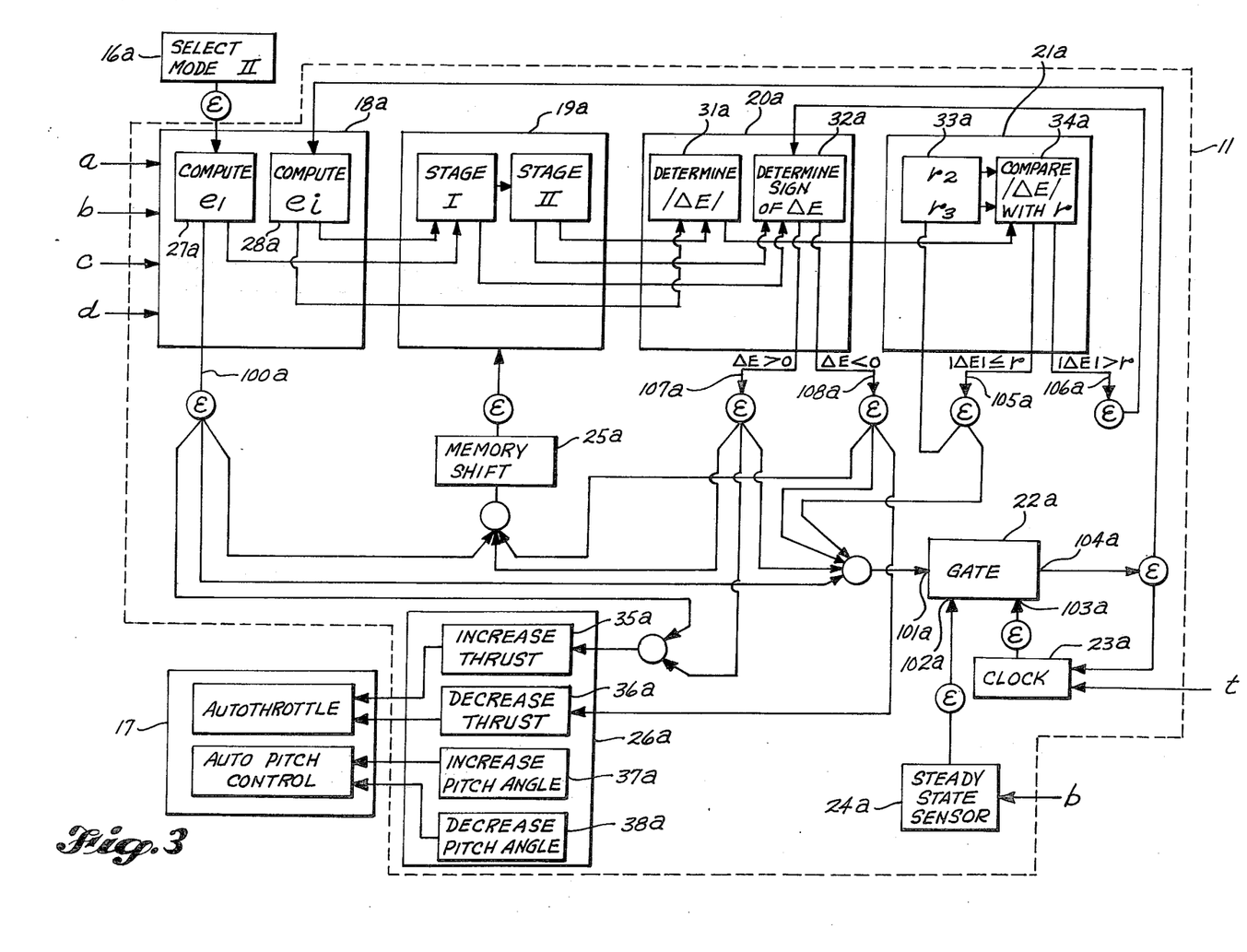
FIG. 3 shows, in schematic form, another logic portion of the control system of the invention.

Although the various portions of the mode I and mode II logic portions have been represented by blocks in FIGS. 2 and 3, it will readily be understood by one of ordinary skill in the art that the blocks represent logic functions which could be performed by discrete circuit stages of a solid state logic chip or by a programmable computer. The precise design of the logic circuit or the computer program could take a number of different forms, and such design is well within the ordinary skill of a technician employed in the field. This design could be routinely completed without the exercise of inventive effort by such a technician.

FIG. 2 is a schematic representation of the mode I logic portion 10 and includes a switch means 16 for selecting mode I as well as the autothrottle and auto pitch control of an aircraft autopilot 17. Note that in FIG. 2, and also in FIG. 3, signals to and from the various elements of the logic portions are represented by arrows, and that arrows including the symbol represent enabling signals whereas arrows without this symbol represent a particular value.

As shown in FIG. 2, the mode I logic portion 10 includes parameter quantification apparatus 18 for receiving signal values h of the operating parameter H and processing or recording these values, a memory 19, difference determining apparatus 20 for determining the difference between signal values h, comparator apparatus 21 for comparing the determined differences between values h with a reference value r, a gate 22, a clock 23, a steady-state sensor 24, memory shifting apparatus 25, and an output command signal generator 26. The parameter quantification apparatus 18 includes a first stage 27 for recording an initial value $h_1$ and a second stage 28 for recording subsequent values $h_i$. The memory includes a stage I portion 29 and a stage II portion 30. The difference determining apparatus 20 includes a portion 31 for determining the absolute value differences between values of h and a portion 32 for determining the sign of the difference between values of h. The comparator apparatus 21 includes a portion 33 for supplying a reference value $r_1$ and a portion 34 for comparing the absolute value difference from portion 31 with the reference value $r_1$. Finally, the output command signal generator 26 includes an increase thrust stage 35, a decrease thrust stage 36, an increase pitch angle stage 37, and a decrease pitch angle stage 38.

Gate 22 includes three input terminals 101, 102, and 103; and a single output terminal 104. Whenever a signal is present at all three of the terminals 101, 102 and 103, an enabling signal will be generated at output terminal 104. The enabling signal at output terminal 104 is in the nature of a pulse, and is only produced each time the gate senses that all three input conditions are satisfied simultaneously. The signal at input 101 can be provided from several different sources, but the signal at input 102 can only be supplied by the steady state sensor 24. The sensor 24 receives current values h of operating parameter H (rate of climb) and generates a signal at input 102 only while the current values of h indicate a substantially constant rate of climb. The signal at input 103 is provided by a clock at time intervals of predetermined duration. The clock is operated by timing pulses t which may be supplied either from within the mode I logic or from an external source. The clock is reset each time an enabling signal is generated at output 104. The signals at inputs 101, 102, and 103 are continuous in the sense that they are effective until the gate has generated an enabling output pulse at 104, but each time a pulse is generated at output 104 the signals at inputs 101, 102, and 103 go to zero and must be replaced by new signals before the gate can generate another output signal.

When mode I is first selected through the operation of switch 16, stage 27 records an initial value $h_1$ representing the rate of climb at the time of mode I selection. Stage 27 introduces the value $h_1$ to stage I portion 29 of memory 19 and also generates a signal 100 which is received by stage 37 of the output command signal generator 26, by input terminal 101 of gate 22, and by the memory shifting apparatus 25. The signal received by stage 37 causes an output command signal to be generated which increases, by a predetermined increment, the setting of the aircraft's pitch control and thus causes a corresponding change in the pitch attitude of the aircraft. At the same time the signal received by memory shifting apparatus 25 causes the value of h previously stored in memory stage I to be transferred to memory stage II.

It should be noted that each of the memory stages is capable of storing only a single value at any given time and that introducing a new value to either stage causes the value previously stored in that stage to be replaced by the new value. When enabled, the memory shifting apparatus simply causes the value stored in stage I to replace the value previously stored in stage II; introducing a new value to stage I has no effect on the value stored in stage II.

With a signal now present at input 101, the gate 22 only requires signals at inputs 102 and 103 to generate an enabling signal at its output 104. A signal will be provided at input 103 as soon as the clock has accumulated its predetermined number of timing pulses, and the signal at input 102 will be provided by the sensor 24 as soon as the aircraft's rate of climb has stabilized following the pitch control adjustment just completed.

Thus, with signals present at all three inputs of gate 22 an enabling signal is generated at output 104, and this signal is provided to stage 28 of the parameter quantification apparatus 18. Upon receiving this signal, stage 28 records the new value h representing current rate of climb and provides this value to stage I of the memory and to portion 31 of the difference determining apparatus 20. Portion 31 also receives the value of h stored in stage II of the memory, and determines the absolute value difference between the two values, which difference is provided as an input to portion 34 of the comparator 21. The comparator then compares the input difference with a reference value $r_1$ provided from its portion 33 and generates a signal 105 if the input difference is less than or equal to the reference value or a signal 106 if the input difference is greater than the reference value.

If a signal 105 was generated from this iteration, the iteration is complete and the signal 105 is provided to input 101 of gate 22 so that another iteration can begin as soon as the required signals are received at gate inputs 102 and 103.

If, instead, a signal 106 was generated from this iteration, the iteration will continue, the signal 106 being received by portion 32 of the difference determining apparatus 20. Upon receiving the signal 106, portion 32 determines the sign of the difference between the two values of h stored in the stage I and stage II memory portions. If this sign is positive, a signal 107 is generated by portion 32, and if it is negative, a signal 108 is generated. In either case a signal is then provided to the memory shifting apparatus 25 to cause a shifting from stage I to stage II of the value previously stored in stage I, and a signal is provided to input 101 of gate 22. A signal 107 also produces an input to stage 37 of the output command signal generator 26 which results in another increase of predetermined magnitude in the pitch control setting and a consequent increase in the pitch attitude of the aircraft, and a signal 108 will produce an input to stage 38 of the output command signal generator 26 and cause a decrease of predetermined magnitude in the pitch control setting with a consequent decrease in the pitch attitude of the aircraft. A new iteration will then begin as soon as all three input conditions at gate 22 have been met.

Iterations will continue in this manner throughout the climb portion of the flight with some iterations including an adjustment in the pitch attitude of the aircraft and some not. It is desirable that the increases in the pitch control setting be slightly different in magnitude from the decreases so that the determined absolute value difference from portion 31 will be brought quickly to a value equal to or less than the reference value. The magnitude of these pitch control setting adjustments may be on the order of 0.2 degrees; and the magnitude of each increase may exceed the magnitude of each decrease by, as an example, 25 percent.

Mode I logic, therefore, causes the sensed value of rate of climb h to be maintained at least within a reference value $r_1$ of an optimum value, and the reference value $r_1$ may be, for example, on the order of two percent of a typical value of h. Thrust is held constant at a maximum rated value and the pitch angle control setting of the aircraft is adjusted while rate of climb is monitored. As the pitch attitude of the aircraft is adjusted in the proper direction the rate of climb changes until a current optimum value is reached, and further adjustment of the pitch attitude will result in an undesirable decrease in the rate of climb. By monitoring the rate of climb parameter after each adjustment in pitch attitude, a substantially optimum setting for the pitch angle control is reached where rate of climb is temporarily substantially maximized.

Figure 8:
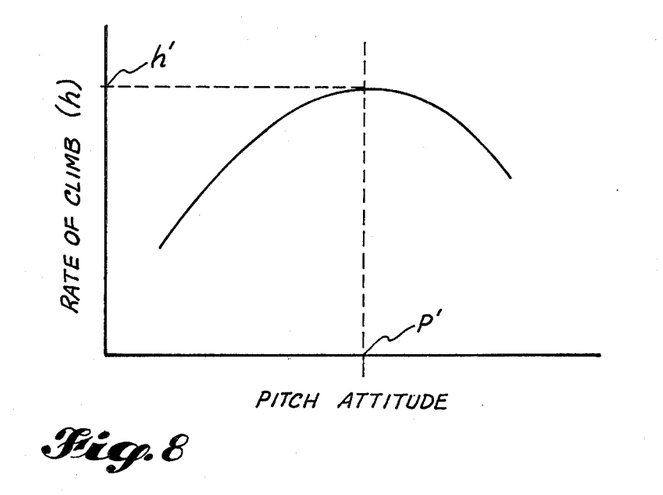
FIG. 8 shows, in graphical form, the rate of aircraft climb as a function of pitch attitude setting.

FIG. 8 shows a plot of rate of climb (h) as a function of pitch attitude for an aircraft operating at constant thrust and under substantially constant conditions in other respects, e.g., constant gross weight at constant ambient temperature. It will be seen from FIG. 8 that rate of climb increases as the pitch angle setting increases until an optimum rate of climb value $h^1$ is reached at a pitch angle setting $P^1$, and subsequent increases in the pitch angle setting will result in a decreasing rate of climb. The goal of mode I operation is to maintain aircraft rate of climb at substantially maximum values during a climb portion of the flight by maintaining the pitch attitude at optimum settings $P^1$ where the slope of the rate of climb vs. pitch attitude curve is zero.

Once a substantially optimum pitch attitude setting is reached subsequent iterations monitor current values of rate of climb (h) until a current value of rate of climb differs by more than the reference value from the difference between the current value of h and the value of h previously determined to be optimum. When this occurs an adjustment in pitch attitude setting once again accompanies each iteration until a new optimum setting has been reached, and the process continues in this manner throughout the climb portion of the flight. It has been determined that by maintaining the rate of climb of the aircraft at or near maximum while holding aircraft thrust constant at a rated maximum, the greatest possible contribution is made during climb to minimizing the total quantity of fuel consumed during an entire flight.

It should be noted that for mode I operation some efficiency parameter which approximates or is a function of rate of climb could be utilized by the mode I logic in place of the sensed rate of climb value. The use of such other efficiency parameter would be a mere matter of design choice. In the operation of mode I just described the operating parameter, rate of climb, was utilized directly as the efficiency parameter.

The mode II logic portion 11 is shown in FIG. 3 together with a switch 16a for selecting mode II and an autopilot 17 including an auto-throttle control and an auto pitch control. The operation of mode II is quite similar to the operation of mode I just described, but for clarity the entire operation of the mode II logic portion will be described in detail.

As shown in FIG. 3, the mode II logic portion 11 includes parameter quantification apparatus 18a for receiving signals a, b, c, and d representing operating parameters A, B, C, and D respectively and computing the value e of an efficiency parameter E and recording said value. The value e is determined by the relationship $e = d + (i\ ac/b)$. The mode II logic portion also includes a memory 19a for storing values e of efficiency parameter E, a difference determining apparatus 20a for determining the difference between values of parameter E, a comparator 21a for comparing the determined differences between values of E with a reference value, a gate 22a for synchronizing iterations of the mode II logic portion, a clock 23a for providing timed inputs to the gate 22a, a steady state sensor 24a for providing steady state signal inputs to gate 22a, memory shifting apparatus 25a for shifting values from stage I to stage II of the memory, and an output command signal generator 26a for generating command signals to cause changes of a predetermined magnitude in the thrust setting of the auto-throttle.

The parameter quantification apparatus 18a includes a first stage 27a for processing or computing an initial value $e_1$ of the efficiency parameter E and a second stage 28a for processing or computing subsequent values $e_i$ of the efficiency parameter. The memory includes a stage I portion and a stage II portion, each stage being capable of storing one and only one value e at a given time. Introducing a new value of e to either stage causes the value previously stored in that stage to be replaced by the new value, and operation of the memory shifting apparatus causes the value stored in stage I to replace the value previously stored in stage II.

The difference determining apparatus 20a includes a portion 31a for determining the absolute values of differences between values e and also includes a portion 32a for determining the sign of the difference between the values e stored in the memory. The comparator 21a includes a portion 33a for supplying either a reference value $r_2$ or a reference value $r_3$ and also includes a portion 34a for comparing the absolute value difference determined from portion 31a with a selected one of these reference values. As seen in FIG. 3, the output command signal generator 26a includes increase thrust and decrease thrust stages 35a and 36a respectively and pitch angle increase and decrease stages 37a and 38a respectively.

The gate 22a includes three input terminals 101a, 102a, and 103a; and a single output terminal 104a. An output signal will be generated at output 104a when and only when input signals are simultaneously present at all three of the inputs 101a, 102a, and 103a. The output signal generated at output 104a is in the nature of a pulse, whereas the three input signals presented at inputs 101a, 102a, and 103a are each continuous in the sense that once presented as an input the signal remains effective until an output signal has been generated at output 104a. Each time an output pulse is generated all the input signals are dissipated and must be replaced before another output signal can be enabled. The signal at input 101a can be provided from several different sources, the signal at input 102a can be supplied only by the steady state sensor 24a, and the signal at input 103a can only be provided by the clock 23a.

The steady state sensor 24a receives an input of signals b which, as earlier stated, represent sensed current values of the ground speed of the aircraft. Whenever the signals b indicate that the ground speed of the aircraft is substantially constant so that a meaningful value for the parameter E can be calculated, an output signal of sensor 24a will appear as an input signal at input 102a of gate 22a. Similarly, an output signal from the clock 23a will appear as an input signal at input 103a of the gate whenever a predetermined number of timing pulses t have been counted by the clock after a reset. The clock is reset each time an output pulse is generated at output 104a of the gate, and the timing pulses t may be provided by the mode II logic portion or supplied from an external source.

When mode II is first selected by operating switch 16a, stage 27a computes an initial value $e_1$ of the efficiency parameter E. For this initial calculation the value d of operating parameter D will be zero and the other values a, b, and c will be the sensed current values of operating parameters A, B, and C respectively. The value $e_1$ is provided by stage 27a of the parameter quantification apparatus to stage I of the memory 19a, and simultaneously stage 27a generates a signal 100a which is received by stage 35a of the output command signal generator 26a, by input 101a of gate 22a, and by the memory shifting means 25a. The signal received by stage 35a of the output command generator results in an increase, by a predetermined magnitude, of the fuel flow rate for the aircraft, and thus the aircraft's thrust is also increased by a predetermined magnitude. The signal received by the memory shifting means 25a causes the value $e_1$ previously stored in stage I of memory 19a to be transfered to memory stage II.

With a signal now present at input 101a, the gate 22a only requires signals at inputs 102a and 103a to generate an enabling signal at its output 104a. A signal will be provided by the clock at input 103a as soon as the lapsed time requirement has been met, and the sensor 24 will provide the needed signal at input 102a upon sensing a steady state ground speed condition. When signals are present at all three gate inputs, the enabling output is generated at output 104a and received by stage 28a of parameter quantification apparatus 18a.

Upon receiving this signal stage 28a computes a new value e of efficiency parameter E from current values a, b, c, and d. The new value e is provided to stage I of the memory and to portion 31a of the difference determining apparatus 20a. Portion 31a also receives the value e stored in stage II of the memory during the preceding iteration, and determines the absolute value difference between these two values. This absolute value difference is then provided as an input to portion 34a of the comparator 21a, and the comparator compares this input difference with a reference value r provided from portion 33a. As shown in FIG. 3, the reference value r may be a predetermined value $r_1$ stored in comparator portion 33a. If the comparison reveals the input difference to be less than or equal to the reference value $r_1$, a signal 105a is generated, and if the input difference is greater than the reference value $r_1$, a signal 106a is generated.

If a signal 105a was generated from this iteration, the iteration is complete and the signal 105a is provided to input 101a of gate 22a so that another iteration can begin as soon as the lapsed time and steady state requirements are once again met. However, if a signal 106a was generated instead of a signal 105a then the present iteration will continue, signal 106a being received by portion 32a of the difference determining apparatus 20a.

Upon receiving the signal 106a, portion 32a of the difference determining apparatus determines the sign of the difference between the two values of e stored in memory stages I and II. If this sign is positive, a signal 107a is generated by portion 32a, and if the sign is negative, a signal 108a is generated. Whichever of these signals is generated, it will be provided to both the memory shifting apparatus 25a for causing a shift from stage I to stage II of the value previously stored in stage I of the memory and to input 101a of gate 22a. In addition, generation of a signal 107a also produces an input to stage 35a of the command signal generator 26a for causing an increase in the thrust of the aircraft; and generation of a signal 108a produces an input to stage 36a of the command signal generator for causing a decrease in the thrust of the aircraft. Another iteration will then begin as soon as gate 22a generates another enabling signal at its output 104a.

The increases and decreases in the thrust of the aircraft which are effected by signals from the output command signal generator 26a will be of a predetermined magnitude such that successive values of the efficiency parameter E will approach a current optimum value. In order to avoid unnecessary additional iterations when the current value of parameter E approaches an optimum value, it is desirable that the thrust increases differ somewhat in magnitude from the decreases. For example, the magnitudes could be predetermined so as to provide an increase of 5 miles per hour in ground speed as the result of a thrust increase and a decrease of 3 miles per hour in ground speed as the result of a thrust decrease. It will be understood that changes in thrust will be effected in response to output command signals by changing the fuel flow rate to the aircraft engines by means of the throttle, and that these changes in thrust will cause corresponding changes in ground speed.

Iterations will continue in this manner throughout the constant altitude cruise portion of the flight with some iterations including an adjustment in aircraft thrust and some not. It will be seen from a comparison of mode I and mode II operations that, as described to this point, mode II logic is very similar to mode I logic, the primary differences being in the signals provided to the quantification apparatus and the stages of the output command signal generator affected. However, there is an additional significant difference between the logics of the two modes as will be hereinafter described.

In mode I operation it is desirable to make frequent adjustments in the pitch attitude of the aircraft in order to continuously maintain a substantially maximum rate of climb. The energy costs, if any, of these frequent changes in pitch attitude are more than offset by the contribution to fuel economy made by a more rapid climb from the lower to the higher altitude. In mode II operation, however, the situation is somewhat different since a substantial fuel cost may be involved in accelerating the aircraft to a more efficient operating speed. Thus, increasing the fuel flow rate, and hence aircraft thrust, in order to bring the aircraft to a more efficient operating speed may cost more in terms of fuel usage than can be saved from the more efficient operation in the time remaining to the end of the flight. Furthermore, frequent series of throttle increases and decreases may be more wasteful in terms of total fuel consumed than can be justified by the fuel savings gained from keeping the aircraft operating continuously at or very near the optimum condition with regard to fuel flow rate.

It is for these reasons that the operating parameters C and D are utilized during mode II operation and that the parameter values c and d representing, respectively, current values of distance remaining to destination and total fuel consumed since mode II selection are used in computing the current value e of efficiency parameter E.

It is also for these same reasons that two different reference values $r_2$ and $r_3$ are selectively provided by portion 33a to portion 34a of the comparator 21a. As will be seen from FIG. 3, whenever a signal 105a is generated by the comparator, that signal is provided back to and sensed by portion 33a. Consequently, whenever a signal 105a is generated, the reference value provided by portion 33a to portion 34a of the comparator for purposes of the next iteration will be $r_3$. The reference value $r_3$ may be pre-programmed or provided from an external source; or, preferably, it may be provided by the mode II logic portion and be a function of the value e stored in stage II of the memory. The value $r_3$ may be, for example, two percent of the value stored in memory stage II; but in any event the value $r_3$ will be significantly greater than the value $r_2$, which may be, for example, one percent of a typical value e.

Thus, the two reference values $r_2$ and $r_3$ will both be available from portion 33a of the comparator. Reference value $r_2$ is provided for comparison purposes in the initial iteration and in any subsequent iteration which follows an iteration wherein a signal 106a was generated, i.e., a change in aircraft thrust was provided. Reference value $r_3$ is provided for comparison purposes only in an iteration which follows an iteration wherein a signal 105a was generated, i.e., a change in aircraft thrust was not provided.

Mode II logic, therefore, causes the aircraft throttle to be adjusted with each iteration until the current value of efficiency parameter E has been substantially optimized, for current operating conditions, with regard to the operating parameters A, B, C, and D using value $r_2$ as the reference for comparison with absolute value differences of e. Following this optimization, iterations continue for the purpose of monitoring current values of efficiency parameter E using value $r_3$ for reference purposes. Each of these iterations determines the absolute value difference between current value e and the value e previously determined to be optimum, and no additional throttle activity will occur until this difference exceeds the reference value $r_3$. When the reference value $r_3$ is exceeded, iterations will again generate throttle activity until current value e is again substantially optimized using value $r_2$ as a reference.

This process will continue throughout the constant altitude cruise portion of the flight. It will usually be true that throttle activity will be more frequent in the early portions of constant altitude cruise and less frequent during later portions. In any case, total throttle activity will generally be limited to adjustments which promote a minimum total fuel consumption for the constant altitude cruise portion of the flight.

Figure 5:
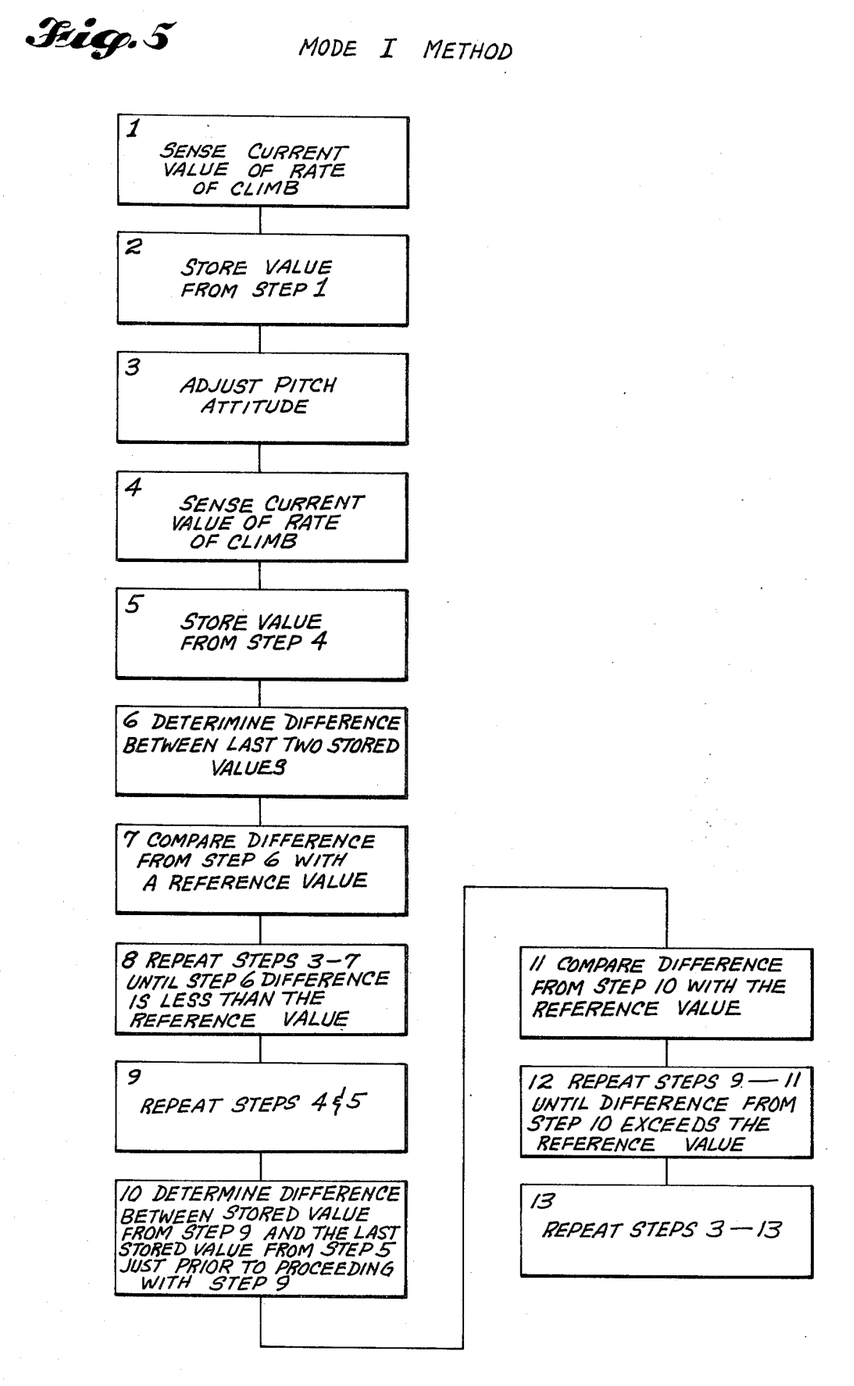
FIG. 5 shows, in block diagram form, a method for one embodiment of the invention.
Figure 6:
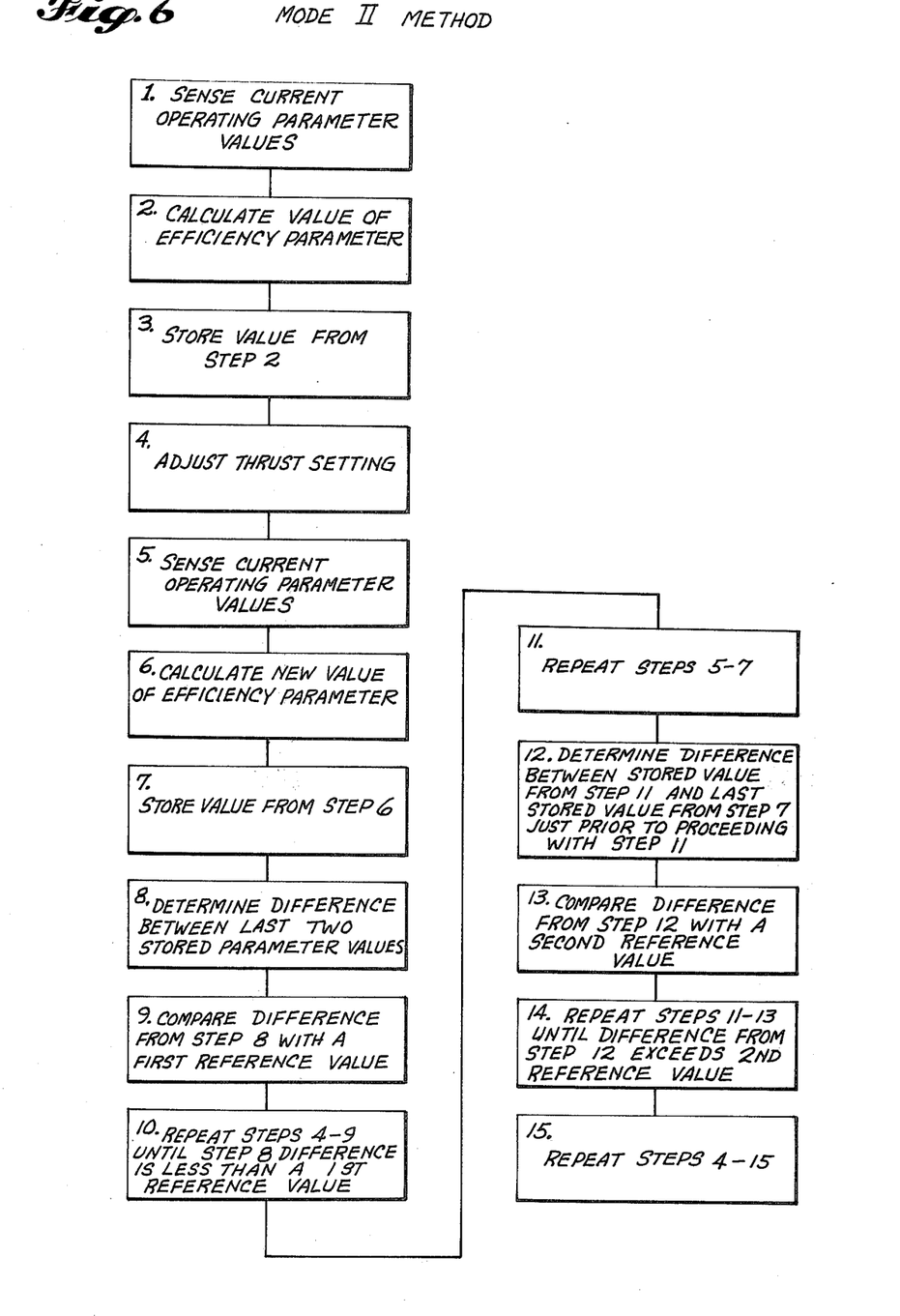
FIG. 6 shows, in block diagram form, a method for another embodiment of the invention.

In FIGS. 5 and 6, methods in accordance with operating modes I and II are shown as comprising certain steps which are implicit in the apparatus heretofore described.

As shown in FIG. 5, a method to be employed in accordance with the invention during the climb portion of an aircraft flight to help minimize the total quantity of fuel consumed during the flight comprises thirteen steps. Prior to performing the first step of the method, the thrust of the aircraft is set at a maximum rated value and held constant at this value continuously during the operation of the method. The first step of the method is to sense the current value of rate of climb of the aircraft, and this can be done using apparatus previously described and represented in FIG. 1 as the block labeled H. Step two of the method is to store the value determined from step 1 for future reference. This can be done by utilizing a memory such as the one identified as 19 in FIG. 2.

The third step of the method is to adjust the pitch attitude of the aircraft by increasing the pitch angle by a predetermined magnitude. This adjustment may be automatic, as by the auto pitch control portion of an autopilot, or manual. The fourth step is to again sense a current value for the rate of aircraft climb, and the fifth step is to store the value determined from step 4. The same memory may be used to store the value from step 4 as was used to store the value from step 1, but the memory must be capable of storing at least two values simultaneously.

Step 6 determines the absolute value difference between the last two stored values of rate of climb. For the first iteration of step 6, the determined difference will be that between the step 1 and step 4 values.

In step 7 the absolute value difference determined in step 6 is compared with a reference value. As described earlier in this application, this reference value may be a predetermined constant provided for all iterations of the method.

Step 8 comprises repeating steps 3, 4, 5, 6 and 7 until the currently-determined difference from step 6 is less than the reference value. Note that the direction of each pitch attitude adjustment of step 3 performed in accordance with step 8 will be in accordance with the sign of the difference determined in the course of the most recent iteration of step 6, so that each iteration of step 8 will tend to decrease the absolute value difference between succeeding stored values. Note also that as step 6 is repeated in accordance with step 8, the stored values being compared are the two most recent values from step 4 operations, the step 1 value no longer qualifying as one of the last two stored values. Step 8 contemplates multiple iterations of the sequence of steps 3 through 7 until the pitch attitude of the aircraft has been substantially optimized with the rate of climb substantially maximized because it would not be practical to maintain the pitch attitude of the aircraft to provide an absolute maximum rate of climb, and use of the reference value provides a substantial approximation of the true optimum condition.

Step 9 comprises repeating steps 4 and 5, and step 10 determines the absolute value difference between the newly-stored step 4 value determined as a result of step 9 and the last stored value from step 5 just prior to proceeding with step 9. In other words, step 10 determines the absolute value difference between the current value of rate of climb and the substantially maximum value of rate of climb determined from the preceding series of iterations involving steps 3 through 8.

Step 11 compares the absolute value difference determined from step 10 with the reference value, and step 12 repeats steps 9 through 11 until such a comparison shows a current difference to be greater than the reference value.

Step 13 is then performed, and this step provides for repeating steps 3 through 13 until the climb portion of the aircraft's flight has been completed.

The method displayed in FIG. 6 comprises fifteen steps and is employed in accordance with the invention to minimize the total quantity of fuel consumed during a constant altitude cruise portion of a flight. Throughout the constant-altitude cruise portion of the flight while the method is being employed, the pitch angle of the aircraft is maintained to provide a zero rate of climb.

The first step of this method is the sensing of current values of certain operating parameters, namely fuel flow rate, ground speed, distance remaining to destination, and total fuel consumed since mode selection; and step 2 is the computing, from these sensed values, the value of an efficiency parameter. The value e of the efficiency parameter E may be computed in accordance with the relationship $e = d + (ac/b)$ where a, b, c, and d are the sensed current values of fuel flow rate, ground speed, distance remaining to destination, and total quantity to fuel consumed since mode selection respectively. Step 3 of the method is the storing of the value e computed in step 2.

The fourth step of the method is the adjustment of the thrust of the aircraft by a predetermined magnitude. This adjustment may be done either automatically or manually and is accomplished through an adjustment of the fuel flow rate to the aircraft engines using the throttle. The adjustment for the first iteration of step 4 may either increase or decrease aircraft thrust.

Step 5 is the sensing of new current values of the same operating parameters sensed in step 1, and step 6 is the calculating of a new current value for the efficiency parameter e based on the values sensed in step 5. In step 7 the value calculated in step 6 is stored for future reference.

Step 8 determines the difference between the last two stored parameter values. For the first iteration of step 8, this difference will be based on the value stored in step 3 and the value stored in step 7; but for subsequent iterations of step 8 the difference will be based on the last two values stored in the two most recent iterations of step 7.

In step 9 the difference determined from step 8 is compared with a first reference value. The reference value will be small with respect to normal values of e; for example, the first reference value may be on the order of 1% of a normal e value.

Step 10 repeats steps 4 through 9. The direction of the thrust setting adjustments according to step 4 which are performed in the course of step 10 will be determined by the result of the determination of step 8. For each iteration of step 10, the adjustment in accordance with step 4 will be in the direction which will decrease the difference between efficiency parameter values e to be determined in step 8. Step 10 is complete when a step 9 comparison shows the difference from step 8 to be less than the first reference value.

Step 11 is to repeat steps 5 through 7, and step 12 determines the difference between the value e stored in step 11 (computed by the most recent iteration of step 6) and the last stored value e from the iteration of step 7 just prior to the most recent iteration of step 11.

Step 13 compares the difference determined in step 12 with a second reference value. The second reference value will be somewhat larger than the first reference value, and may be, for example, a function of the second value e used in step 12. The second reference value could be, for example, some percentage of this second value such as 2% thereof.

Step 14 repeats steps 11 through 13 until a comparison of step 13 reveals that the most recent iteration of step 12 has determined a difference which is greater than the second reference value. Step 15 repeats steps 4 through 15 until the constant-altitude cruise portion of the flight has been completed.

FIG. 4 shows a control panel which could be used with the control system of the invention. The control panel would be located in the aircraft adjacent other aircraft controls within easy access of the pilot. The control panel 50 includes a button 51 for operating the switch 5, a button 52 for operating the switch 16 and a button 53 for operating the switch 16a. Indicator lights 54 and 55 are provided which correspond to lights 8 shown in FIG. 1, and indicator lights 56 and 57 are provided which correspond to lights 7 also shown in FIG. 1. The light 54 may be a green light which is on whenever the signal monitor 12 is receiving repetitive signals a and h and the switch 12a is closed allowing mode I logic to be selected. Similarly, light 56 may be a green light which is on whenever the signal monitor 13 is receiving repetitive signals a, b, c, d, and h and switch 13a is therefore closed allowing mode II logic to be selected. The light 55 may be energized whenever mode I is operating, and the light 56 may be energized whenever mode II is operating.

It will be apparent from the foregoing detailed description that the invention provides a control system which substantially minimizes fuel consumption for an entire flight, and particularly the combined climb and cruise portions thereof, by sensing current values of relevant operating parameters and adjusting operation of the aircraft in accordance with these operating parameters. It will further be apparent that the control system of the invention, through mode I and mode II operation thereof, achieves an improved overall fuel economy for the flight by, to a controlled extent, sacrificing current momentary opportunities to optimize rate of fuel consumption in order to substantially optimize total fuel economy for the entire flight.

Numerous modifications of the invention disclosed herein will be apparent to those skilled in the art. For example, the relationship disclosed herein for determining efficiency parameter values from the values of relevant operating parameters could be modified somewhat to adapt the system of the invention efficiently to particular circumstances. As a further example, additional logic could be provided so that in mode II operation the system would automatically estimate the expected total fuel savings over the remainder of the flight which would result from certain indicated throttle activity and compare this estimate with the immediate fuel cost to complete said throttle activity, the contemplated throttle activity then being performed only if justified by the comparison. Further, the values d of parameter D could, instead of being supplied from separate sensing equipment as heretofore suggested, be determined by the computing apparatus as a function of operating parameter A. That is, the computing apparatus could be designed to generate values of total fuel consumed since mode II selection by integrating, over time, the values of fuel flow rate received from the input apparatus.

Accordingly, the foregoing description of my invention discloses a preferred embodiment thereof, and various changes and omissions in form and detail may be made within the scope of the invention.

What I claim is:

1. A control system for improving the fuel economy of an operating aircraft during flight by sensing current values of operating parameters of said aircraft and adjusting controls of said aircraft as a function of said current values, said control system comprising:
    input means for repetitively generating first, second, third, fourth, and fifth input signals representing current sensed values indicative of rate of climb, fuel flow rate, ground speed, distance remaining to destination, and total fuel already consumed during cruise respectively;
    computing means including a first logic circuit for receiving said first signals and generating first output command signals in response thereto, and a second logic circuit for receiving said second, third, fourth, and fifth signals and generating second output command signals in response thereto;
    selection means for enabling a selected one of said first and second logic circuits in response to a selection input; and
    an aircraft control including a pitch angle control for effecting incremental changes in the pitch attitude of the aircraft in response to said first output command signals, and a throttle control for effecting incremental changes in the thrust of said aircraft in response to said second output command signals, whereby when said first logic circuit is enabled for a climb portion of said flight the rate of climb of said aircraft is substantially maximized during said climb portion, and when said second logic circuit is enabled for a cruise portion of said flight the total quantity of fuel consumed during said cruise portion is substantially minimized.

2. The control system of claim 1 including means for preventing the enabling of said first logic circuit except when said fuel flow rate for said aircraft is substantially constant.

3. The control system of claim 1 including means for preventing the enabling of said second logic circuit except when said rate of climb for said aircraft is substantially zero.

4. The control system of claim 1 wherein said computing means iteratively determines a current value of an efficiency parameter which is a function of current input signals to the selected logic circuit, and said output command signals are generated in response to differences determined by said computing means between values of said efficiency parameter.

5. The control system of claim 1 wherein said computing means iteratively determines a current value of an efficiency parameter which is a function of current input signals to the selected logic circuit, and said output command signals are generated in response to absolute-value differences determined by said computing means between values of said efficiency parameter.

6. The control system of claim 5 wherein the computing means determines the sign of the difference between said values of said efficiency parameter, and said output command signals effect said incremental changes in a direction according to said sign of said difference.

7. Apparatus for substantially maximizing the contribution of fuel consumed by an aircraft during a climb portion of a flight to overall fuel economy for the flight by sensing values indicative of the current rate of climb of said aircraft and adjusting the pitch attitude of said aircraft as a function of said sensed values, said apparatus comprising:
    input means for repetitively generating input signals representative of current values of rate of climb for said aircraft,
    computing means for iteratively receiving and processing said input signals and generating output command signals in response to the iterations of said computing means, and
    a control for repeatedly maximizing said current rate of climb by effecting incremental changes in the pitch attitude of said aircraft in response to said output command signals.

8. The apparatus of claim 7 wherein the computing means includes a memory for storing the rate of climb value determined from one iteration, and means for determining the difference between said stored value and the rate of climb value determined during a subsequent iteration, said output command signals being generated as a function of the determined difference.

9. The apparatus of claim 8 wherein the sign of said incremental change in the pitch attitude of said aircraft depends on the sign of said determined difference.

10. The apparatus of claim 8 wherein said iterations compare successive rate of climb values, and an output command signal is generated as a result of each iteration until a comparison of successive rate of climb values indicates that the rate of climb has currently been substantially optimized.

11. Apparatus for substantially maximizing the contribution of fuel consumed by an aircraft during a climb portion of a flight to overall fuel economy for the flight by sensing values indicative of the current rate of climb of said aircraft and adjusting the pitch attitude of said aircraft as a function of said sensed values, said apparatus comprising:
    input means for repetitively generating input signals representative of current values of rate of climb for said aircraft,
    computing means for iteratively receiving and processing said input signals and generating output command signals in response to the iterations of said computing means, and
    a control for effecting incremental changes in the pitch attitude of said aircraft in response to said output command signals,
    said computing means including a memory for storing the rate of climb value determined from one iteration, and means for determining the difference between said stored value and the rate of climb value determined during a subsequent iteration, said output command signals being generated as a function of the determined difference,
    said apparatus further including comparator means and means for providing a reference value to said comparator means, said comparator means comparing the absolute value of said determined difference with said reference value, and said output command signals being generated only when the absolute value of said determined difference is greater than said reference value.

12. The apparatus of claim 11 wherein said reference value is a predetermined constant.

13. The apparatus of claim 11 wherein said reference value is a function of a previous rate of climb value.

14. In an aircraft having an engine for developing thrust to propel said aircraft, a throttle control for controlling the thrust developed by said engine, a pitch axis control for controlling the pitch attitude of the aircraft, and instruments for sensing values indicative of and generating signals representing the current rate of climb of said aircraft; a control system for substantially maximizing the contribution of fuel consumed by an aircraft during a climb portion of a flight to overall fuel economy for the flight, said control system comprising:

selection means for selectively energizing said control system;
 parameter quantification means for repetitively receiving said signals from said instruments and iteratively generating a parameter value which is a function of said signals;
 a memory connected to said parameter quantification means for receiving said parameter value and storing said values;
 difference determining means for receiving current parameter values from said parameter quantification means and stored parameter values from said memory and determining the difference therebetween; and
 comparator means, including a stored reference value, for comparing said difference with said reference value and generating a response based on said comparison, said throttle control response to said selection means for maintaining said thrust at a maximum rated value throughout said climb portion of said flight, and said pitch axis control effecting an incremental change in said pitch attitude of said aircraft as a function of said response.

15. In an aircraft as claimed in claim 14 wherein said apparatus includes synchronizing means for providing at least a predetermined time interval between successive iterations of said parameter quantification means.

16. In an aircraft as claimed in claim 14 wherein said apparatus includes synchronizing means for permitting an iteration of said parameter quantification means only when said signals representing current values of rate of climb indicate a substantially constant rate of climb.

17. In an aircraft as claimed in claim 14 wherein said apparatus includes synchronizing means for preventing a new iteration of said parameter quantification means until the immediately preceding iteration has been completed.

18. A control system for an aircraft having a pitch axis control for controlling the pitch attitude of the aircraft, and instruments for sensing values indicative of and generating signals representing the current rate of climb of said aircraft, said control system comprising:

parameter quantification logic connected to said instruments for repetitively receiving said signals therefrom and iteratively quantifying a parameter value from said signals;
 a memory connected to said parameter quantification logic, said memory receiving a parameter value from said parameter quantification logic for each iteration of said parameter quantification logic and storing each said parameter value;
 difference determining logic connected to said memory, said difference determining logic receiving the parameter value from the most recent iteration of said parameter quantification logic and a stored parameter value and determining the difference therebetween;
 comparator logic connected to said difference determining logic, said comparator logic receiving the absolute value of the determined difference from said difference determining logic and comparing said absolute value difference to a reference value, said comparator logic providing an output signal to said difference determining logic which is a function of the comparison, said pitch axis control connected to said difference determining logic and responsive to signals from said difference determining logic which are a function of the determined differences and said output signals from said comparator logic for incrementally adjusting the pitch attitude of said aircraft and thereby maintaining a generally optimum rate of climb for said aircraft.

19. A control system as in claim 18 including synchronizing logic comprising a gate, a clock connected to said gate, and a steady-state sensor connected to said gate;

said gate connected to said difference determining logic, to said comparator logic, and to said parameter quantification logic;
 said gate providing an output signal to said parameter quantification logic to initiate another iteration thereof when and only when said gate receives simultaneous input signals from said clock, said steady-state sensor, and one of said difference determining logic and said comparator logic.

20. Apparatus for substantially minimizing the total quantity of fuel consumed by an aircraft during a constant-altitude cruise by sensing values indicative of the values of current operating parameters of said aircraft and adjusting the thrust of said aircraft as a function of said sensed values, said apparatus comprising:

input means for repetitively generating input signals a, b, c, and d representative of current values of fuel flow rate, ground speed, distance remaining to destination, and total fuel already consumed during cruise;
 computing means for iteratively receiving and processing said input signals and generating output command signals in response to the iterations of said computing means; and
 a control for effecting incremental changes in the thrust of said aircraft in response to said output command signals.

21. The apparatus of claim 20 wherein the computing means during each iteration computes the value e of an efficiency parameter defined by the relationship:

$$e = d + (ac/b)$$

22. The apparatus of claim 21 wherein the computing means includes a memory for storing the value e determined from one iteration, and means for determining the difference between said stored value e and the value e determined during a subsequent iteration, said output command signals being generated as a function of the determined difference.

23. The apparatus of claim 22 including comparator means and means for providing a reference value to said comparator means, said comparator means comparing the absolute value of said determined difference with said reference value, and said output command signals being generated only when said absolute value of said determined difference is greater than said reference value.

24. The apparatus of claim 23 wherein said reference value is a predetermined constant.

25. The apparatus of claim 23 wherein said reference value is a function of a previously computed value e.

26. The apparatus of claim 23 wherein said reference value is a predetermined first value in each iteration where the immediately preceding iteration resulted in the generation of an output command signal and said reference value is a predetermined second value in each iteration where the immediately preceding iteration did not result in the generation of an output command signal.

27. The apparatus of claim 23 wherein said reference value is a first value while successive iterations compare successive values e and a second value while successive iterations compare a current value e with a stored value e previously determined to be a substantially optimum value.

28. The apparatus of claim 22 wherein the sign of the incremental change in the thrust of said aircraft depends on the sign of said determined difference.

29. The apparatus of claim 22 wherein said iterations compare successive values e, and an output command signal is generated as a result of each iteration until a comparison of successive values e indicates that value e has currently been substantially optimized.

30. In an aircraft having an engine for developing thrust to propel said aircraft, a control for regulating the thrust developed by said engine, and instruments for sensing values indicative of and generating signals representing current values of fuel flow rate, ground speed, distance to destination, and total fuel already consumed during cruise; a control system for substantially minimizing the total quantity of fuel consumed during a constant-altitude cruise portion of the flight of said aircraft, said control system comprising:
  selection means for selectively energizing said apparatus;
  parameter quantification means for repetitively receiving said signals from said instruments and iteratively generating current values of an efficiency parameter which is a function of said signals;
  a memory connected to said parameter quantification means for receiving said current efficiency parameter values and storing said values;
  difference determining means for receiving current efficiency parameter values from said parameter quantification means and stored efficiency parameter values from said memory and determining the difference therebetween; and
  comparator means, including a stored reference value, for comparing said difference with said reference value and generating a response based on said comparison, said control effecting an incremental change in said thrust as a function of said response.

31. In an aircraft as claimed in claim 30 wherein said parameter quantification means generates current values e of an efficiency parameter defined by the relationship $$e = d + (ac/b)$$

where d is the total fuel already consumed during cruise, a is the current fuel flow rate, b is the current ground speed, and c is the distance remaining to destination.

32. In an aircraft as claimed in claim 30 wherein said apparatus includes synchronizing means for providing at least a predetermined time interval between successive iterations of said parameter quantification means.

33. In an aircraft as claimed in claim 30 wherein said apparatus includes synchronizing means for permitting iterations of said parameter quantification means only when said signals representing current values of said ground speed indicate a substantially constant ground speed.

34. In an aircraft as claimed in claim 30 wherein said apparatus includes synchronizing means for preventing a new iteration of said parameter quantification means until the immediately preceding iteration has been completed.

35. A control system for an aircraft having an engine for developing thrust to propel said aircraft, a control for regulating the thrust developed by said engine, and instruments for sensing values indicative of and generating signals representing current values of fuel flow rate, ground speed, distance remaining to point of decent, and total fuel already consumed during cruise; said control system comprising:
  parameter quantification logic connected to said instruments for repetitively receiving said signals therefrom and iteratively quantifying an efficiency parameter value e from said signals in accordance with the relationship $e = d + (ac/b)$, where a represents current fuel flow rate, b represents current ground speed, c represents the current distance remaining to point of descent, and d represents the total quantity of fuel already consumed during cruise;
  a memory connected to said parameter quantification logic, said memory receiving an efficiency parameter value from said parameter quantification logic for each iteration of said parameter quantification logic and storing each said efficiency parameter value;
  difference determining logic connected to said memory, said difference determining logic receiving the efficiency parameter value from the most recent iteration of said parameter quantification logic and a stored efficiency parameter value and determining the difference therebetween;
  comparator logic connected to said difference determining logic, said comparator logic receiving the absolute value of the determined difference from said difference determining logic and comparing said absolute value difference to a reference value, said comparator logic providing an output signal to said difference determining logic which is a function of the comparison, said control connected to said difference determining logic and responsive to signals from said difference determining logic which are a function of said determined differences and said output signals from said comparator logic for incrementally adjusting the thrust of said aircraft.

36. A control system as in claim 35 including synchronizing logic comprising a gate, a clock connected to said gate, and a steady-state sensor connected to said gate;

said gate connected to said difference determining logic, to said comparator logic, and to said parameter quantification logic;

said gate providing an output signal to said parameter quantification logic to initiate another iteration thereof when and only when said gate receives simultaneous input signals from said clock, said steady-state sensor, and one of said difference determining logic and said comparator logic.

37. A method for substantially minimizing the total quantity of fuel consumed by an aircraft during the combined climb and cruise portions of a flight, said method comprising the steps of:
   (1) setting the thrust of said aircraft at a maximum rated value and maintaining the thrust at said maximum rated value during said climb portion of said flight,
   (2) repetitively sensing values indicative of current rate of climb of said aircraft,
   (3) iteratively processing the current values sensed in step (2) and generating signals as a function of said processing,
   (4) controlling the pitch attitude of said aircraft in response to the signals from step (3) so as to continuously maintain the aircraft at a substantially maximum rate of climb during said climb portion of said flight,
   (5) bringing the aircraft to a constant-altitude cruise and maintaining the constant altitude of said aircraft during said cruise portion of said flight,
   (6) repetitively sensing values indicative of current values for the aircraft of fuel flow rate, ground speed, distance remaining to destination, and total fuel already consumed during said cruise portion of said flight,
   (7) iteratively processing the current values sensed in step (6) and generating signals as a function of said processing, and
   (8) controlling the thrust of said aircraft during said cruise portion of said flight in response to the signals from step (7) so as to substantially minimize the total quantity of fuel consumed during said cruise portion of said flight.

38. A method for substantially maximizing the contribution to overall fuel economy for a flight of fuel consumed by an aircraft during a climb portion of the flight during which said aircraft is climbing to a cruising altitude, said method comprising the steps of:
   (1) setting the thrust of said aircraft at a maximum rated value and maintaining the thrust at said maximum rated value during said climb portion of said flight,
   (2) repetitively sensing values indicative of current rate of climb of said aircraft,
   (3) iteratively processing the current values sensed in step (2) and generating signals as a function of said processing, and
   (4) repeatedly maximizing the current rate of climb of said aircraft during said climb portion of said flight by controlling the pitch attitude of said aircraft in response to the signals from step (3).

39. A method for substantially minimizing the total quantity of fuel consumed by an aircraft during a cruise portion of a flight, said method comprising the steps of:
   (1) bringing the aircraft to a constant-altitude cruise and maintaining the constant altitude of said aircraft during said cruise portion of said flight,
   (2) repetitively sensing values indicative of current values for the aircraft of fuel flow rate, ground speed, distance remaining to destination, and total fuel already consumed during said cruise portion of said flight,
   (3) iteratively processing the current values sensed in step (2) and generating signals as a function of said processing, and
   (4) controlling the thrust of said aircraft during said cruise portion of said flight in response to the signals from step (3) so as to substantially minimize the total quantity of fuel consumed during said cruise portion of said flight.

40. A method for substantially maximizing the contribution of fuel consumed by an aircraft during a climb portion of a flight to overall fuel economy for the flight, said method comprising the steps of:
   (1) setting the thrust of said aircraft at a maximum rated value and maintaining the thrust at said maximum rated value during said climb portion of said flight,
   (2) sensing a value indicative of the current rate of climb of said aircraft,
   (3) storing the value sensed in step (2),
   (4) incrementally adjusting the pitch attitude of said aircraft,
   (5) sensing a value indicative of the current rate of climb of said aircraft,
   (6) storing the value sensed in step (5),
   (7) determining the difference between the value sensed in the most recent iteration of step (5) and the value stored immediately prior to said most recent iteration,
   (8) incrementally adjusting the pitch attitude of said aircraft as a function of the difference determined in step (7), and
   (9) repeating steps (5) through (8) until a difference determined in step (7) indicates that the current rate of climb of said aircraft has been substantially maximized.

41. The method according to claim 40 including the additional steps of:
   (10) continuing to sense values indicative of the current rate of climb of said aircraft,
   (11) determining the absolute value difference between each newly-sensed value from step (10) and the value stored in the most recent iteration of step (6),
   (12) comparing each absolute value difference determined in step (11) with a reference value until said absolute value difference exceeds said reference value, and
   (13) repeating steps (4) through (13) until said climb portion of said flight is completed.

42. A method for substantially maximizing the contribution of fuel consumed by an aircraft during a climb portion of a flight to overall fuel economy for the flight, said method comprising the steps of:
   (1) setting the thrust of said aircraft at a maximum rate value and maintaining the thrust at said maximum rated value during said climb portion of said flight,
   (2) sensing a value indicative of the current rate of climb of said aircraft,
   (3) storing the value sensed in step (2),
   (4) incrementally adjusting the pitch attitude of said aircraft, (5) sensing a value indicative of the current rate of climb of said aircraft, (6) storing the value sensed in step (5), (7) determining the absolute value difference between the last two stored values, (8) comparing the difference determined from step (7) with a reference value, (9) repeating steps (4) through (8) until a difference determined in step (7) is less than the reference value, (10) repeating steps (5) and (6), (11) determining the absolute value difference between the stored value from step (10) and the last stored value from step (6) just prior to proceeding with step (10), (12) comparing the difference from step (11) with the reference value, (13) repeating steps (10) through (12) until the difference from step (11) exceeds the reference value, and (14) repeating steps (4) through (14) until said climb portion of said flight is completed.

43. A method for substantially minimizing the total quantity of fuel consumed by an aircraft during a cruise portion of a flight, said method comprising the steps of:

(1) bringing the aircraft to a constant-altitude cruise and maintaining the constant altitude of said aircraft during said cruise portion of said flight, (2) sensing values indicative of current values for the aircraft of fuel flow rate, ground speed, distance remaining to destination, and total fuel already consumed during said cruise portion of said flight, (3) computing the current value of an efficiency parameter which is a function of the sensed values from step (2), (4) storing the parameter value computed in step (3), (5) incrementally adjusting the thrust of said aircraft, (6) sensing values indicative of current values for the aircraft of fuel flow rate, ground speed, distance remaining to destination, and total fuel already consumed during said cruise portion of said flight, (7) computing the current value of said efficiency parameter based on the sensed values from step (6), (8) storing the parameter value computed in step (7), (9) determining the difference between the efficiency parameter value sensed in the most recent iteration of step (7) and the efficiency parameter value stored immediately prior to said most recent iteration, (10) incrementaly adjusting the thrust of said aircraft as a function of the difference determined in step (9), (11) repeating steps (6) through (10) until a difference determined in step (9) indicates that a substantially optimum current aircraft thrust has been attained.

44. The method according to claim 43 including the additional steps of:

(12) continuing to sense values indicative of current values for the aircraft of fuel flow rate, ground speed, distance remaining to destination, and total fuel already consumed during said cruise portion of said flight and continuing to compute the current values of said efficiency parameter as a function of these values, (13) determining the absolute value difference between each newly-computed parameter value from step (12) and the parameter value stored from the most recent iteration of step (7), (14) comparing each absolute value difference determined in step (13) with a reference value until said absolute value difference exceeds said reference value, (15) repeating steps (6) through (10) until a difference determined in step (9) indicates that a substantially optimum current aircraft thrust has once again been attained, (16) repeating steps (5) through (16) until said cruise portion of said flight is concluded.

45. A method for substantially minimizing the total quantity of fuel consumed by an aircraft during a cruise portion of a flight, said method comprising the steps of:

(1) bringing the aircraft to a constant-altitude cruise and maintaining the constant altitude of said aircraft during said cruise portion of said flight, (2) sensing values indicative of current values for the aircraft of fuel flow rate, ground speed, distance remaining to destination, and total fuel already consumed during said cruise portion of said flight, (3) calculating the current value of an efficiency parameter based on the values from step (2), (4) storing the parameter value calculated in step (3), (5) incrementally adjusting the thrust of said aircraft, (6) sensing values indicative of current values for the aircraft of fuel flow rate, ground speed, distance remaining to destination, and total fuel already consumed during said cruise portion of said flight, (7) calculating the current value of said efficiency parameter based on the sensed values from step (6), (8) storing the parameter value calculated in step (7), (9) determining the absolute value difference between the last two stored values of said efficiency parameter, (10) comparing the difference determined from step (9) with a first reference value, (11) repeating steps (5) through (10) until a difference determined in step (9) is less than said first reference value, (12) repeating steps (6) through (8), (13) determining the absolute value difference between the stored value from step (12) and the most recently stored value from step (8) just prior to proceeding with step (12), (14) comparing the difference from step (13) with a second reference value, (15) repeating steps (12) through (14) until the difference from step (13) exceeds the second reference value, and (16) repeating steps (5) through (16) until said cruise portion of said flight is concluded.

* * * * *